United States Patent [19]

Reed

[11] Patent Number: 5,095,540

[45] Date of Patent: Mar. 10, 1992

[54] HOLE PLACEMENT AND FILL SYSTEM BASED ON CATEGORY SELECTION

[75] Inventor: John D. Reed, Arlington, Tex.

[73] Assignee: Motorola, Inc., Schaumburg, Ill.

[21] Appl. No.: 486,497

[22] Filed: Feb. 28, 1990

[51] Int. Cl.[5] ............... H04B 1/48; H04B 1/56; H04J 3/12

[52] U.S. Cl. .................... 455/73; 455/78; 370/29; 370/111

[58] Field of Search ............... 455/78, 79, 73; 370/94.1, 95.1, 24, 29, 79-81, 101, 111; 381/29, 30, 31, 34, 35

[56] References Cited

U.S. PATENT DOCUMENTS

| | | | |
|---|---|---|---|
| 4,056,779 | 11/1977 | Toler . | |
| 4,394,760 | 7/1983 | Kammerlander | 370/111 |
| 4,813,040 | 3/1989 | Futato | 370/111 |
| 4,864,561 | 9/1989 | Ashenfelter et al. | 370/81 |
| 4,893,308 | 1/1990 | Wilson et al. | 370/111 |
| 4,949,335 | 8/1990 | Moore | 370/29 |

FOREIGN PATENT DOCUMENTS

0115618 A1  8/1984  Fed. Rep. of Germany .

OTHER PUBLICATIONS

"A Class Oriented Replacement Technique for Lost Speech Packets", IEEE Transactions on Acoustics, Speech, and Signal Processing, vol. 37, No. 10, Oct. 1989.

"Waveform Substitution Techniques for Recovering Missing Speech Segments in Packet Voice Communications", IEEE Transactions on Acoustics, Speech, and Signal Processing, vol. ASSP-34, No. 6, Dec. 1986.

Primary Examiner—Reinhard J. Eisenzopf
Assistant Examiner—Lisa Charouel
Attorney, Agent, or Firm—Michael J. Buchenhorner

[57] ABSTRACT

A communication device, has a receiver for receiving an audio signal, and an apparatus for producing a signal that is representative of the audio signal. A first analyzer analyzes at least a portion of the representative signal to determine whether the portion of the representative signal belongs to a predetermined category. The communication device also includes a transmitter that transmits a signal having an audio portion, with holes placed therein, and a first signalling information indicating whether the portion of the representative signal belongs to the predetermined category. A second analyzer analyzes the portion of the representative signal to determine at what times to place holes in the audio signal.

11 Claims, 2 Drawing Sheets

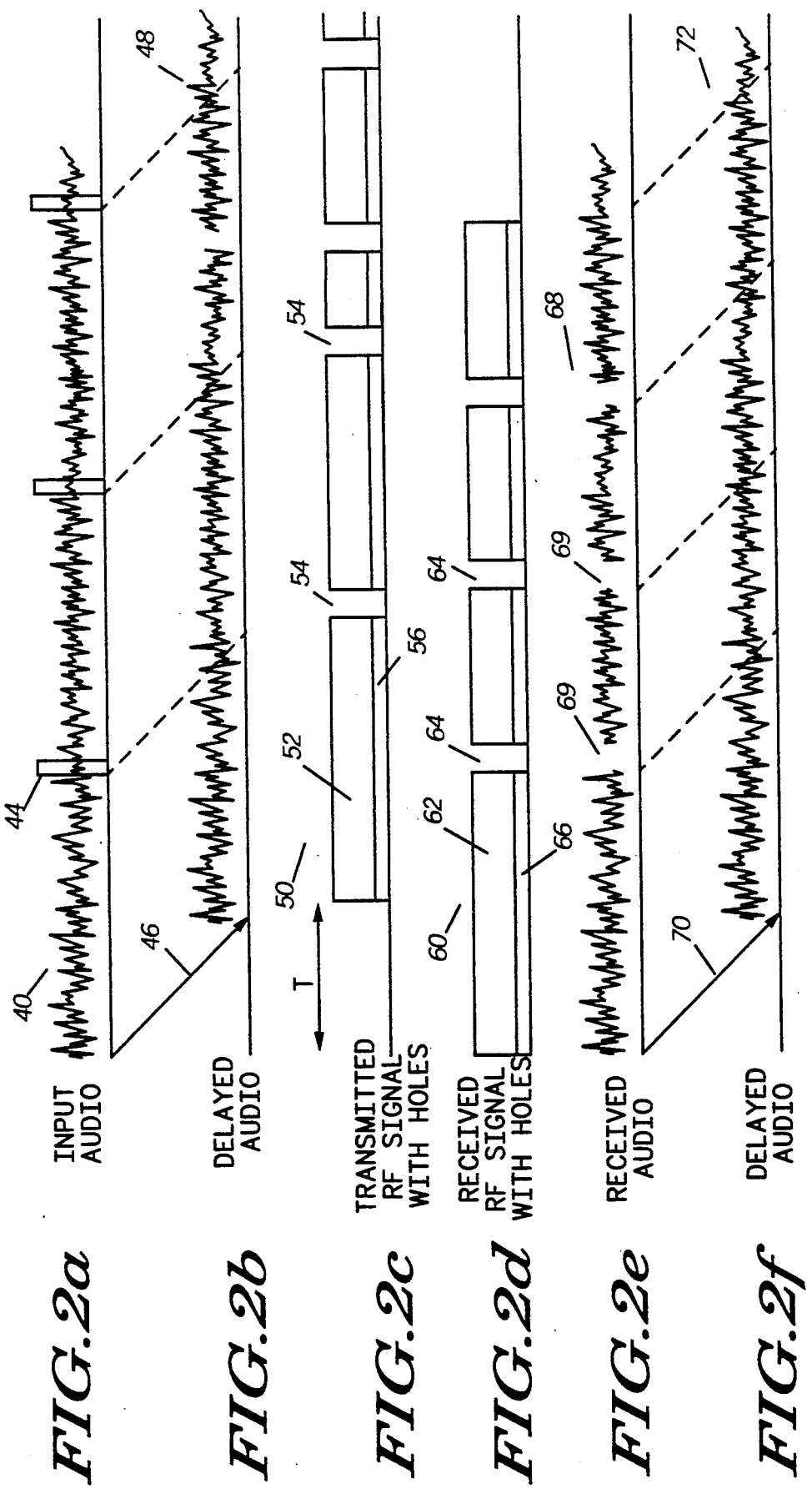

HOLE PLACEMENT AND FILL SYSTEM BASED ON CATEGORY SELECTION

TECHNICAL FIELD

This invention relates generally to communication systems and apparatus.

BACKGROUND

Placing holes (i.e., gaps) in the audio portion of a radio transmission is necessary in order to allow interruptions of transmissions in quasi-duplex communication systems. In addition, information may be transmitted in the holes. However, some applications for these holes may require that their duration be as long as 40 mS, or more. Holes of such duration may significantly degrade the quality of the audio signal. When these holes occur at a relatively high frequency (e.g., 3 times per second) the audio degradation may become unacceptable to most listeners. Therefore, some hole filling (i.e., replacement of the information removed to create a hole) may become necessary to preserve the quality of the audio.

Most hole-fill algorithms fix drop-outs or noise bursts. Those systems generally have very short time frames (e.g., 8 mS) and thus are relatively easy to fix. However, where longer hole durations are used, better hole-fill methods are required.

SUMMARY OF THE INVENTION

Briefly, according to the invention, a communication device includes means for receiving an audio signal and means for producing a signal that is representative of the audio signal. In addition, analyzing means determine which portions of the representative signal belong to at least one predetermined category that is suitable for replacement by holes. A transmitter transmits an output signal that includes audio information, with holes placed therein in place of at least some portions of the audio information that correspond to those portions of the representative signal that belong to the predetermined category, and signalling, identifying the predetermined category of at least some of the portions into which holes are placed.

BRIEF DESCRIPTION OF THE DRAWINGS

FIGS. 2a-2f are graphic representations of signals transmitted, received, or processed in accordance with the invention.

FIGS. 3a and 3b are flow charts showing hole placement and filling processes in accordance with the invention.

DETAILED DESCRIPTION OF THE PREFERRED EMBODIMENT

Figure 1:
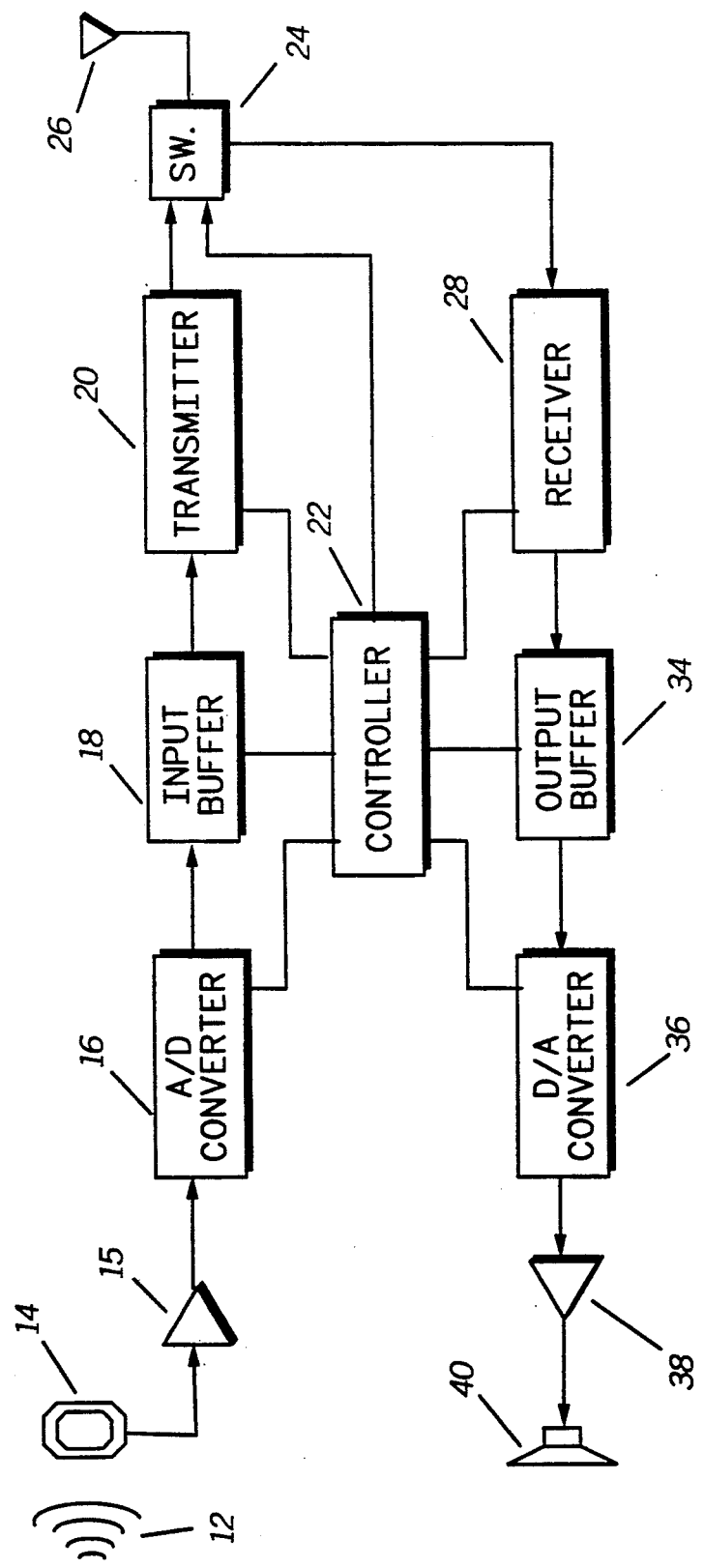
FIG. 1 shows a radio in accordance with the invention.

Referring to FIG. 1, a radio 10, in accordance with the invention is shown. An audio signal 12 is received at a microphone 14 and amplified by an audio amplifier 15. An analog-to-digital (A/D) converter 16 converts the audio signal 12 to a digital signal, with a controller 22 (e.g., a conventional digital signal processor such as the Motorola DSP56001, or its functional equivalent), and provides that digital audio signal to an input buffer 18, for storing at least a portion of the digitized audio signal. Such storage allows the controller 22 to process the stored portion of the digitized audio signal before transmission thereof by a transmitter 20. The transmitter 20 is connected to an antenna 26 when the switch 24 (controlled by the controller 22) is in the "transmit position."

The controller 22 analyzes the digitized audio signal to determine which portions of the audio signal belong to any of several categories that the controller has been programmed to recognize. Those categories represent types of signal portions that are suitable for replacement by holes of a predetermined length. The controller 22 also determines at what times holes may be placed in the audio signal, as it is transmitted, based on the category determinations. The controller 22 then sends information to the transmitter 20 indicating the category of each removed audio portion and the time that each hole will occur in the transmitted audio, so that the transmitter 20 may transmit that information to other communication devices (not shown). The other communication devices, if they have the capability, can interrupt the transmission of the radio 10, during the occurrence of a hole, to transmit their own messages and thereby accomplish quasi-duplex operation, or fill in the holes in the received audio in a manner determined according to the category of the portion of the audio removed if the transmission is not interrupted.

The controller 22 also causes the audio information to be stored in the input buffer 18. The audio information is then sent to the transmitter 20 in digital form. Depending on the transmitter design, at least one digital-to-analog converter might be used to convert at least some of the audio information to analog signals prior to modulation.

Appropriate hole placement times are determined by the controller 22 according to a set of preprogrammed criteria. For example, common types of hole placement include: (1) periodic hole placement, e.g., 3 times per second; (2) placement in pauses in the voice transmission that are long enough to contain a hole (if there are no such pauses during a given time period (T) a hole is forced in), (3) placement of the hole in an audio portion representing a word or sound that has a fairly consistent pitch and amplitude across the audio portion including one or more pitch periods on each side of that audio portion, (4) placement of the hole in an audio portion that could be considered noise, having no significant pitch or audio power, and (5) placement of the hole in an audio portion that matches a prestored audio characteristic (e.g., any specific response or speech transition). Other criteria for hole placement may also be programmed into the controller 22.

From the hole selection process, the controller 22 identifies a category for each portion of the audio to be removed to form a hole. That category is of great benefit for the communication unit (the receiving unit) to receive the transmitted audio signal and to fill the holes therein. Therefore, a digital number representing each category is encoded by the controller 22 along with the location of the hole for transmission to the receiving unit. That information may be represented by sub-audible data transmitted along with the audio signal. The sub-audible data is sent prior to the hole it corresponds to, because it is informing the receiving unit when the hole will occur.

The receiving unit can fill the holes in the received audio in several ways. The best way to fill the holes would require knowledge of what was removed from the holes. However, in most systems it is impossible to send that information. Therefore, the best practical way to fill the holes is to use the information on what category the removed portion belongs to, and information on the portions of the transmitted audio immediately preceding and following each hole to approximate the information removed by the hole. With that information, the communication device receiving the signal may choose the most appropriate type of hole-fill process or algorithm. Thus, a more accurate way of filling the holes may be achieved.

When the switch 24 is in the "receive" position, the receiver 28 may receive radio-frequency (RF) signals containing holes and timing and category data. The receiver 28 demodulates the received RF signal and recovers the audio, and decodes the timing and category data. These signals are output from the receiver as digital signals, which might be obtained by using at least one analog-to-digital converter in the receiver 28. Then, the audio portion of the received RF signal is stored in digital form in a buffer 34 for hole-fill processing that is performed by the controller 22. The receiver 28 is coupled to the controller 22 to provide the controller 22 with the timing and category data. The controller 22 uses that data to choose the most appropriate hole-fill processes. Once the holes have been filled, the resulting audio signal is sent by the controller 22 from the output buffer 34 to a digital-to-analog converter 36 for production of an analog signal to be provided to an audio amplifier 38 for amplification and then to a speaker 40 for presentation to the user of the radio 10.

Referring to FIG. 2a, an input audio signal 40 is shown. The input audio signal 40, preferably representing human speech, is sampled by the controller 22 (of FIG. 1) to determine which portions are suitable for replacement with holes. The holes are identified after processing audio samples stored in the input buffer 18. A predetermined category is assigned to each portion of the audio 40 suitable for replacement by a hole, based on predetermined hole selection criteria that may be programmed into the controller 22. In FIG. 2a, the portions 44 have been determined to be suitable for replacement by holes. The input audio signal 40 represents either an analog or digital audio signal (the signal is preferably digital, so that it may be more easily analyzed).

Referring to FIG. 2b, a delayed audio signal 48 is shown. The delayed audio signal 48 is delayed (46) by storage in the input buffer 18 during its analysis by the controller 22.

Referring to FIG. 2c, an RF output signal 50 transmitted by the transmitter 20 is shown. The length of the delay from reception of the audio input signal 40 to the transmission of the output signal 50 is denoted by the letter T. The delay T is required for hole selection in the original audio signal 40 and for sending a sub-audible data signal prior to the occurrence of a hole. If the delay T, before a hole, is longer than the time required to send the sub-audible information 56, a simple sub-audible "idle" tone (i.e., a "1", "0" pattern) could be used on one or both sides of the timing information. The output signal 50 comprises an audio-modulated portion (i.e., audio information) 52, sub-audible signalling information 56, and a plurality of holes 54. The sub-audible signalling information 56 contains hole location data (describing the location of the next hole), category data (describing what type of information was replaced by the hole at the transmitter end of the radio 10), unit ID, and any other radio control information.

Referring to FIG. 2d, an RF input signal 60 received by the receiver 28 is shown. The RF input signal 60 contains audio information 62, signalling information 66, and a plurality of holes 64.

Referring to FIG. 2e, after the input signal 60 is demodulated, a received audio signal 68 is obtained. The received audio signal 68 contains a plurality of holes 69, corresponding to the holes 64. If the received audio signal 68 is analog, the receiver 28 can convert it to digital form for easier processing thereof. The holes 69 must be filled to improve the quality of the audio to be presented to the user of the radio 10.

Referring to FIG. 2f, a delayed audio signal 72 (without holes) is shown. The delayed audio signal 72 is the result of a hole-filling process performed on the received audio signal 68. The hole-fill processing is done based on the received sub-audible information 66 (including hole location and the category information of the audio portion replaced by the hole). A buffer delay 70 is required for the performance of the hole-filling process.

Therefore, by processing the data on hole timing and category at the transmitter, the hole-fill process to be performed by the receiving unit is improved.

Referring to FIG. 3a, a flow chart illustrates a process for making and filling hoes in a transmitted audio signal. The process begins at step 100. First, in step 102 an analog audio signal is received. In step 104, the analog audio signal is converted to digital form. In step 106, the digitized audio signal is stored in a buffer (18) for processing thereof. In step 108, the controller (22) determines which portion of the audio signal belong to (22) places interrupt holes in the portion of the digitized audio signal that have been determined to belong to the predetermined categories. In step 112, a signal is transmitted. The transmitted signal comprises: (1) an audio-modulated portion; (2) a signalling information portion; and (3) a plurality of holes.

Referring to FIG. 3b, in step 114 a receiver receives the signal transmitted in step 114. In step 116, the received signal is demodulated to obtain the audio portion of the received signal and the category information. In step 118, the audio portion is stored in a buffer. In step 120, a hole-fill process is selected in accordance with the received category information. In step 122, the holes in the audio portion are filled using the hole-fill process selected in step 120.

What is claimed is:

1. A communication device, comprising:
    means for receiving an audio signal;
    means for producing a representative signal that represents the audio signal;
    analyzing means for locating portions of the representative signal belonging to a set of predetermined categories of signal portions suitable for replacement by holes; and
    a transmitter for transmitting an output signal, the output signal comprising:
    audio information having holes occurring in place of the portions of the representative signal belonging to the set of predetermined categories of signal portions suitable for replacement by a hole; and
    signalling information identifying the predetermined categories of the representative signal that have been replaced by holes.

2. The communication device of claim 1, further comprising:

a receiver for receiving an input signal, the input signal representing a transmitted audio signal, and the input signal comprising (1) input audio information having holes therein, the holes replacing removed portions of the transmitted audio signal, and (2) input signalling information identifying predetermined categories of the portions of the audio information that were replaced by holes, and the input signalling information comprising hole-timing data indication the time at which each hole will occur in the audio information;

means for demodulating the input signal to obtain a recovered audio portion, and to decode the input-signalling information; and means for replacing the holes in the input audio information with information of a category specified by the input signalling information.

3. The communication device of claim 2, wherein the means for replacing the holes replaces the holes in the input audio information with approximate information based on the input signalling information, and on information relating to portions of the input audio information immediately preceding and immediately following each hole.

4. The communication device of claim 2, wherein the audio signal comprises analog information, and wherein the means for producing a representative signal further comprises an analog-to-digital converter for converting the analog information to a digital signal, so that the representative signal is digital.

5. The communication device of claim 2, wherein the communication device is a radio.

6. A receiver for receiving an input signal, the input signal representing an audio signal, and the input signal including (1) input audio information having holes therein, and (2) input signalling information identifying predetermined categories of the portions of the audio information that were replaced by holes, the receiver comprising:

means for demodulating the input signal to obtain the input audio portion and to obtain the input signalling information; and means for replacing the holes in the received audio in a manner determined by the signalling information.

7. The receiver of claim 6, wherein the means for replacing the holes replaces the holes in the input audio information with approximate information based on the input signalling information, and on information relating to portions of the input audio information immediately preceding and immediately following each hole.

8. A method for filling holes in a transmitted audio signal, comprising the steps of:

with a transmitter, receiving an audio signal;

producing a representative signal that represents the audio signal;

locating portion of the representative signal belonging to a set of predetermined categories suitable for replacement by a hole; and transmitting an output signal, the output signal comprising:

audio information having holes occurring in place of at least some of the portions of the audio information that correspond to those portions of the representative signal that belong to the predetermined category; and signalling information identifying the predetermined category of at least some of the portions of the audio information into which holes are placed.

9. The method of claim 8, further comprising the steps of:

with a receiver;

receiving an input signal, the input signal representing an audio signal, and the input signal comprising input audio information having holes therein, the holes replacing removed portions of the audio signal, and input signalling information identifying predetermined categories of the removed portions of the audio signal, and the input signalling information comprising data indicating the time at which each hole will occur in the audio information;

demodulating the input signal to obtain the input audio portion; and replacing the holes in the received audio with information of a category specified by the input signalling information.

10. The communication device of claim 9, wherein the audio signal comprises analog information.

11. The communication device of claim 9, further comprising the step of:

with the transmitter:

converting the audio signal to a digital audio signal, so that the representative signal is digital.

* * * * *